United States Patent [19]

Daly et al.

[11] Patent Number: 4,907,282

[45] Date of Patent: Mar. 6, 1990

[54] METHOD AND APPARATUS FOR CONSTRUCTING, STORING AND DISPLAYING CHARACTERS

[75] Inventors: Joseph P. Daly, Artane; Denis G. Hennessy, Rathgar; Philip Samways, Newport, all of Ireland

[73] Assignee: nHance Development Corporation, Dublin, Northern Ireland

[21] Appl. No.: 296,852

[22] Filed: Jan. 13, 1989

Related U.S. Application Data

[63] Continuation of Ser. No. 906,760, Sep. 12, 1986, abandoned.

[30] Foreign Application Priority Data

Sep. 13, 1985 [IE] Ireland ................................ 2259/85

[51] Int. Cl.⁴ ................................................ G06K 9/34

[52] U.S. Cl. .......................................... 382/9; 382/47; 382/56; 364/518; 340/731

[58] Field of Search ............... 364/518, 521, 522, 523; 340/730, 731, 735, 747, 748; 358/77, 96, 263, 903; 382/9, 10, 20, 21-26, 47, 48, 51, 56

[56] References Cited

U.S. PATENT DOCUMENTS

| | | | |
|---|---|---|---|
| 4,298,945 | 11/1981 | Kyte et al. | 364/523 |
| 4,517,604 | 5/1985 | Casher et al. | 382/56 |
| 4,628,534 | 12/1986 | Marshall | 382/47 |
| 4,630,309 | 12/1986 | Karow | 382/21 |
| 4,674,058 | 6/1987 | Lindbloom et al. | 364/518 |
| 4,675,830 | 6/1987 | Hawkins | 364/518 |
| 4,675,831 | 6/1987 | Ito et al. | 364/518 |
| 4,682,189 | 7/1987 | Purdy et al. | 340/747 |
| 4,685,068 | 8/1987 | Greco et al. | 364/518 |
| 4,688,182 | 8/1987 | Schrieber | 364/518 |
| 4,692,806 | 9/1987 | Anderson et al. | 382/56 |
| 4,700,320 | 10/1987 | Kapur | 364/518 |
| 4,742,558 | 5/1988 | Ishibashi et al. | 382/56 |
| 4,751,507 | 6/1988 | Hama et al. | 340/731 |
| 4,764,975 | 8/1988 | Inoue | 340/731 |
| 4,780,711 | 10/1988 | Doumas | 340/747 |
| 4,785,296 | 11/1988 | Tabata et al. | 340/731 |

*Primary Examiner*—Leo H. Boudreau
*Assistant Examiner*—Jose L. Couso
*Attorney, Agent, or Firm*—Finnegan, Henderson, Farabow, Garrett and Dunner

[57] ABSTRACT

A method and apparatus for creating and storing characters for display on a video screen. The shape of the graphic character is displayed at various degrees of resolution. The graphic character is stored as a bitmap or as coefficients of spline curves. These can be scaled up or down to give different character sizes. The coefficients can be converted to form pixelmaps which are rectangular arrays of pixels. The pixelmaps may have gray scale values.

16 Claims, 18 Drawing Sheets

```
SP 24,65 0,0 28,65 0,0 0
SP 24,15 0,0 28,15 0,0 4
SP 12,60 0,0 12,84 0,0 2
SP 12,20 0,0 12,16 0,0 2
SP 12,16 0,0 0,16 0,0 4
SP 0,16 0,0 0,84 0,0 5
SP 0,84 0,0 12,84 0,0 0
SP 48,44 -0.302585,6.274624 28,65 -5.197471,-0.047590 0
SP 48,36 -0.302585,-6.274624 28,15 -5.197471,0.047590 3
SP 13.000,43.000 0.200000,3.000000 21.000,52.000 2.000000,0.000000 2
SP 35.000,43.000 -0.200000,3.000000 27.000,52.000 -2.000000,0.000000 5
SP 13,37 0.2,-3 21,28 2,0 0
SP 35,37 -0.2,-3 27,28 -2,0 6
SP 21,28 0,0 27,28 0,0 0
SP 13,37 0,0 13,43 0,0 2
SP 21,52 0,0 27,52 0,0 4
SP 35,43 0,0 35,37 0,0 6
SP 48,36 0,0 48,44 0,0 2
SP 12.000,60.000 0.000780,0.600000 24.000,65.000 2.000000,0.000000 7
SP 12.000,20.000 0.000000,-0.600000 24.000,15.000 2.000000,0.000000 5
FP 6,40
```

FIG. 7

<--- SECOND CHAR --->

| | A | J | T | Y | QOGC | S | WV | ZXURPNMLKIHFEDB | lkihb | rpnm | qoedca | g | zxu | ywv | tsf | j |
|---|---|---|---|---|---|---|---|---|---|---|---|---|---|---|---|---|
| LA | 0 | 1 | -4 | -5 | 1 | 1 | -4 | 1 | 1 | 1 | 0 | 1 | 1 | -1 | 0 | -1 |
| RK | 0 | 0 | 0 | 0 | 0 | 0 | 0 | 1 | 1 | 0 | 0 | 0 | 0 | -1 | 0 | -1 |
| QDB | 0 | 1 | 1 | 0 | 2 | 2 | 1 | 3 | 3 | 3 | 2 | 2 | 3 | 1 | 2 | 0 |
| Y | -5 | -1 | 1 | 1 | 0 | 0 | 1 | 2 | 2 | 1 | -1 | -1 | 1 | 0 | 1 | 0 |
| OGC | 0 | 1 | 1 | 0 | 2 | 2 | 1 | 3 | 3 | 3 | 2 | 2 | 3 | 1 | 2 | 0 |
| PF | -1 | 0 | 2 | 1 | 2 | 2 | 1 | 2 | 3 | 2 | 1 | 1 | 2 | 1 | 2 | 0 |
| XS | 0 | 1 | 1 | 0 | 2 | 3 | 0 | 3 | 3 | 3 | 2 | 2 | 3 | 1 | 2 | 0 |
| TWV | -4 | -1 | 1 | 0 | 1 | 0 | 1 | 1 | 1 | 1 | 0 | 0 | 1 | 1 | 1 | -1 |
| EHIJMNUZ | 0 | 1 | 2 | 1 | 2 | 2 | 1 | 3 | 3 | 3 | 2 | 2 | 3 | 2 | 2 | 1 |
| ljifd | 1 | 2 | 2 | 1 | 3 | 2 | 1 | 3 | 3 | 3 | 2 | 3 | 3 | 2 | 2 | 0 |
| qg | 1 | 2 | 1 | 0 | 3 | 2 | 0 | 3 | 3 | 3 | 2 | 3 | 3 | 2 | 2 | 1 |
| za | 1 | 2 | 1 | 0 | 3 | 2 | 0 | 3 | 3 | 3 | 2 | 3 | 3 | 2 | 2 | 0 |
| urnmh | 1 | 2 | 0 | -1 | 3 | 2 | -1 | 3 | 3 | 3 | 2 | 3 | 3 | 1 | 2 | 0 |
| poecb | 0 | 1 | 0 | -1 | 2 | 2 | -1 | 3 | 3 | 3 | 2 | 3 | 3 | 1 | 2 | 0 |
| yxwvts | 1 | 2 | 0 | -1 | 2 | 2 | -1 | 3 | 3 | 3 | 2 | 2 | 3 | 1 | 2 | 0 |
| k | 0 | 0 | 0 | -1 | 1 | 1 | -1 | 2 | 2 | 2 | 0 | 0 | 2 | 0 | 0 | -1 |

FIG. 12

METHOD AND APPARATUS FOR CONSTRUCTING, STORING AND DISPLAYING CHARACTERS

This application is a continuation of application Ser. No. 906,760, filed Sept. 12, 1986, now abandoned.

BACKGROUND OF THE INVENTION

The present invention relates to a method and apparatus for creating and storing characters, for example, letters, numbers, punctuation marks, symbols and the like, as well as graphic primitives, such as, lines, arcs, curves, circles and the like, and also computer graphics and the like. Further, the invention relates to a method and apparatus for retrieving and displaying the stored characters on, for example, a monitor.

a. Font Storage

1. Bitmaps

Typefaces utilized in the display of information on computer display devices are traditionally laid out in matrix structures known as bitmaps. These are rectangular arrays of points where each point represents a pixel to be turned on during the display of that character. Bitmaps are often stored in computer memory devices called character generators and are specified in terms of the "character matrix", the size of a character in horizontal and vertical pixels. Common matrix sizes are 5×7 and 7×9.

Bitmap fonts need an amount of memory for storage which is proportional to the size of the character matrix. The following table shows some sample character sizes and the amount of bit storage needed per character:

| Character Matrix | Bit Storage per Character |
|---|---|
| 5 × 7 | 35 |
| 7 × 9 | 63 |
| 16 × 24 | 384 |
| 32 × 48 | 1536 |
| 64 × 96 | 6144 |

Some computer systems use proportionally spaced bitmap fonts. In these systems the characters are not displayed on a fixed grid, but rather each character takes an amount of space in proportion to its size. This is similar to the way in which typesetters lay out text whereas fixed-spaced characters look more like typewriter text. For proportionally-spaced characters it is necessary to store information indicating the size of the character together with the bitmap pattern for each character.

2. Splines

A spline is a parametric cubic equation representing a curved line in which the X and Y values of each point along the curve are represented as a third-order polynomial of some parameter t. Four coefficients define the position and tangent vectors of each end point of the line and by varying t from 0 to 1, a curve is described between the end points. Well-known types of splines are the "Hermite", "Bezier" and "B-spline." These differ primarily in the significance of the four defining coefficients. The Hermite curve defines the position and tangent vectors at the end points. The Bezier curve defines the curve end points and two other points which are the end points of the tangent vectors. The B-spline curve approximates the end points (does not guarantee that the curve will pass through these points) but describes a curve whose first and second order derivatives are continuous at the segment end points.

A character pattern can be defined in terms of splines by storing data representing a series of curves which make up the character outline. When the character is displayed this outline is filled in on the display screen to produce a solid character.

The advantages of splines over bitmaps as a means of storing character fonts is their economy of storage and the fact that they can easily be scaled to any desired size. An average character can be stored with 20 spline curves, requiring only 80 coefficient values. Spline curves preserve their shape as their coefficients are scaled, enabling the same set of coefficient data to be utilized in displaying characters of different sizes.

3. How fonts are normally stored

In computer systems not used to display graphics, character fonts are usually stored as bitmaps in a read only memory (ROM) associated with a character generator circuit. The character matrix usually varies from 5×7 to 9×13 and is not proportionally-spaced. The character is designed to fill the display cell as much as possible and characters are often given serifs to make narrow characters appear wider. When graphics are required, the fonts are also usually stored in a bitmap form although the bitmap is stored in CPU memory instead of in a memory dedicated to the character generator. The characters are usually displayed in fixed display cells. In systems adapted to display characters in varying sizes or on output devices with a very high resolution (e.g., laser printers or photo-typesetters), splines are often used.

b. Font Creation

Normally, at the design stage, low- and high-resolution characters are treated differently. Low-resolution characters are created as bitmaps; bits are turned on to give the most appealing character. High-resolution characters are created by drawing appealing characters (or using existing typefaces), and matching their outlines with splines.

When spline character designs are required for a high resolution display device, the designer has the option of creating the designs on paper and "wrapping" the splines around them, or taking an existing typeface and wrapping the spline curves around its outline. This is normally done using a high resolution graphics terminal and adjusting the splines until they fit the outline of the character.

While these systems work well in the environments for which they were designed, namely phototypesetting systems and very high resolution output devices, they have major drawbacks when used in a display system having a pixel density of less than 100 pixels per inch. The pixel density of a 640×480 pixel display on a 13 inch (diagonal) cathode ray tube monitor is about 62 pixels per inch.

c. Font Display

1. Screen Memory Organization

For a computer to represent an image on a raster-scanned display screen, the entire screen image is usually stored in a display memory. There are two basic design approaches to representing a screenfull of characters in memory. These are called "cell-based" and "bitmapped" designs.

For cell-based designs, the screen is divided into rectangular "cells" each of which can hold a character. For a display of 40 characters by 20 lines the screen memory would need to contain 800 bytes. Each of the cells are the same size on the screen and this size corresponds to the character matrix of the character generator.

The individual memory location for each cell can hold a value from 0 to 255. This is the ASCII code of the character to be displayed at that position. The display controller scans each cell sequentially across and down the screen and reads each cell location in turn. The ASCII code found there is sent to the character generator along with the current row within the character cell and the character generator outputs the row of bits for that character. The output of the character generator is serialized and any bits that are set (on) correspond to visible pixels on the screen.

Because of the hardware structure of cell-based displays, graphics and proportional character and inter-character spacing are not possible. Mainly because of their lack of graphics, cell-based designs are being used less in computer displays.

In the case of bitmap designs, the screen memory has one location for each pixel on the screen. The value at each location corresponds to the color of that pixel; if the location can hold 256 different values then the screen can display 256 different colors. For a display of 640 horizontal pixels by 480 vertical pixels, a screen memory size of 307,200 bytes is needed. The CRT controller supplies the address of each byte in turn which is read from screen memory and displayed. To display a character on the screen, the CPU has to write each pixel in the character design into the proper location in screen memory.

2. Bits per Pixel

A term often used in describing screen memory is the number of "bits per pixel". A bit is the smallest digital storage element and can represent one of two states, on or off, 1 or 0, bright or dark. The bits per pixel term is an indication of how many values a screen pixel can hold, i.e., the number of distinct colors or gray levels it can represent. The number of colors which can be represented is calculated as 2 to the power of the bits per pixel term. Therefore, if the screen memory has 8 bits per pixel, it can represent 256 different colors. A "pixelmap" is the term used in this specification to describe a rectangular array of pixels.

3. Single bit display

When the display is monochrome, the character font bitmap is usually stored as one bit per pixel. This is true even if the screen memory has more than one bit per pixel. Since the character bitmap stores several pixels per computer word, several character bitmap pixels are read together. If the display memory also stores several pixer per computer word, the same applies to display writes.

4. Gray scale display

The fundamental problem of displaying a high resolution image on a low resolution display is that the image is sampled at a rate which is too low to accurately represent the original image. The effect is known as "aliasing" and occurs frequently when characters are displayed on low resolution displays.

To reduce the effects of aliasing, some existing computer systems use several gray levels at the edges of the characters. This gives the impression of the characters being drawn on a higher resolution grid than the display grid. Because the characters were not initially designed for sampling on the display grid, however, the characters rarely have a clean outline, even on a character with a straight edge which needs no correction and give the impression of having a gray, fuzzy outline around the character.

In this specification the term video screen is the term used to cover all forms of visual display units such as but not exclusively computer screens, VDU's and LCD's.

OBJECTS

Accordingly, it is an object of the present invention to provide a method for creating and displaying characters on a computer controller output device, such as a monitor or hard copy output device, whereby the problems of anti-aliasing and distortion are reduced, especially at low resolutions.

Another object of the invention is to provide pixelmaps for efficient font storage.

Another object of the invention is to provide splines for efficient font storage.

A further object of the invention is to provide a combination of pixelmaps and splines for efficient font storage.

A still further object of the invention is to provide proportional inter-character spacing in a computer controlled display system.

Additional objects and advantages of the present invention will be set forth in part in the description that follows, which is given by way of example only and in part will be obvious from the description and may be learnt by practice of the invention.

The accompanying drawings, which are incorporated in and constitute a part of this specification, illustrate one embodiment of the invention and, together with the description, serve to explain the principles of the invention.

SUMMARY OF THE INVENTION

This invention provides a computer system for creating graphic characters for display on a video screen, comprising:

display means for displaying a graphic character at a plurality of different degrees of resolution;

means for determining the shape of the displayed graphic characters for said displayed degrees of resolution by changing pixels forming the graphic character displayed for the higher of said plurality of degrees of resolution; and storage means for storing the graphic character for the higher resolution.

The invention further provides a method of operating a computer system for creating graphic characters for display on a video screen, comprising the steps of:

displaying a graphic character at a plurality of different degrees of resolution;

determining the shape of the displayed graphic character by changing pixels forming the graphic character displayed for the higher of said plurality of degrees of resolution; and storing the graphic character for the higher resolution.

In this latter method the displayed graphic character has three degrees of resolution, high, medium, and low, such that the graphic character corresponding to the medium resolution has approximately one-fourth of the pixels of the graphic character corresponding to the high resolution, and the graphic character corresponding to the low resolution has approximately one-fourth of the pixels of the graphic character corresponding to the medium resolution.

Additionally the invention provides a computer system for displaying graphic characters on a video screen, comprising:

storage means for storing graphic characters as coefficients for spline curves which are a function of the boundaries of the respective graphic characters;

conversion means for converting said coefficients to form a pixelmap of the character, said pixelmap including gray scale values from full on to full off for pixels at points along the boundary of the displayed graphic character; and display means for displaying said formed pixelmap.

There is also provided a method of operating a computer system for displaying graphic characters on a video screen, comprising the steps of:

storing graphic characters as coefficients for spline curves as a function of the boundaries of respective graphic characters;

converting said coefficients to form a pixelmap of the graphic character, said pixelmap including gray scale values from full on to full off for pixels at points along the boundary of the displayed graphic character;

displaying said formed pixelmap.

The invention further provides a computer system for displaying graphic characters on a video screen, comprising:

storage means for storing pixelmaps corresponding to graphic characters, said pixelmaps including gray scale values from full on to full off for pixels at points along the boundaries of the stored graphic characters; and display means for displaying the pixelmaps of a respective graphic character in a selected color against a background having a different selected color;

means for mixing the character color and the background color for each boundary pixel in accordance with the gray scale value of the pixel.

According to the invention there is provided a method of operating a computer system for displaying graphic characters on a video screen, comprising the steps of:

storing pixelmaps corresponding to graphic characters, said pixelmaps including gray scale values from full on to full off for pixels at points along the boundaries of the stored graphic characters;

displaying the pixelmap of a respective graphic character in a selected color against a background having a different color; and mixing the character color and the background color for each boundary pixel in accordance with the gray scale value of the pixel.

Additionally the invention provides a computer system, comprising:

means for initially displaying graphic characters having at least two different degrees of resolution;

means for determining the shape of said characters for said different degrees of resolution by changing the pixels of corresponding characters having the higher resolution;

means for generating coefficients of spline curves for determining boundaries of said higher resolution characters;

storage means for storing said spline curve coefficients;

means for selectively scaling said stored coefficients for generating pixelmaps in accordance with said scaled coefficients;

means for generating a pixelmap from coefficients corresponding to each character; said pixelmap having gray scale values for each boundary pixel corresponding to the percentage of such pixel within the boundary as determined by said spline curve coefficients; and means for displaying pixelmaps for said characters in accordance with the selected scaled coefficients.

Further there is provided a method of operating a computer system, comprising the steps of:

displaying initially graphic characters having at least two different degrees of resolution;

determining the shape of said characters for said different degrees of resolution by changing the pixels of corresponding characters having the higher resolution;

generating coefficients of spline curves for determining boundaries of said higher resolution characters;

storing said spline curve coefficients of the higher resolution characters;

scaling selectively said stored coefficients for generating pixelmaps in accordance with said scaled coefficients;

generating a pixelmap from each coefficient corresponding to each character; said pixelmap having gray scale values for each boundary pixel corresponding to the percentage of such pixel within the boundary as determined by said spline curve coefficients; and displaying pixelmaps for said characters in accordance with the selected scaled coefficients.

BRIEF DESCRIPTION OF THE DRAWINGS

FIG. 7 is an example of a spline list format for storage of a single character.

FIG. 12 is a sample shape code table used under computer program control for determining proportional intercharacter spacing.

Figure 1A:
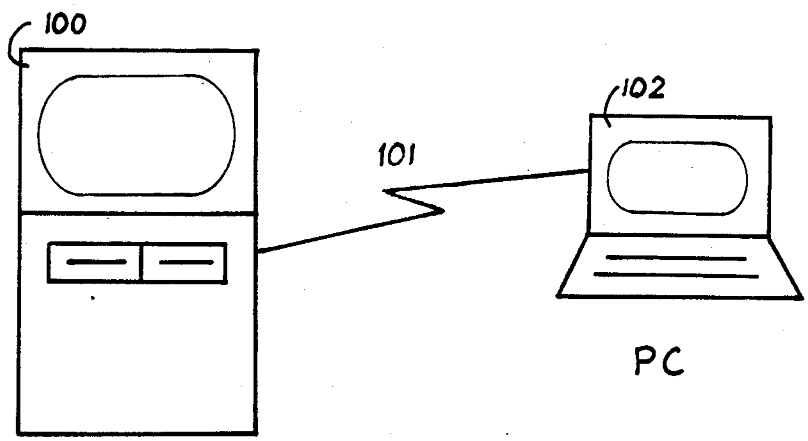
FIG. 1*a* is a block diagram of the components and hardware of one embodiment of the character generation system of the present invention.

DESCRIPTION OF THE PREFERRED EMBODIMENT a. Overview

The present invention comprises a computer controlled method and apparatus for constructing, storing, and displaying graphic characters which are essentially letters of the alphabet, numbers, symbols, graphic primitives and the like. The invention further comprises two main areas:

(1) construction of the graphic characters and their input into computer memory, and (2) retrieval of the graphic characters for display on a display system.

Graphic characters (or fonts) are initially defined by using a high resolution graphics display unit. The characters are designed at the resolutions at which they will be displayed and then spline curves are fitted to these predesigned characters. When these spline-defined characters are subsequently sampled onto a low resolution character grid, the problems of aliasing are greatly reduced.

All characters are converted to pixelmaps for display. Since this takes a finite amount of time, the most frequently used characters may be stored in pixelmap form. Pixelmaps include gray scale values for each boundary square through which the spline curve passes.

When the characters are displayed in color (and on a color background), the antialiasing operation is applied to each character pixel to interpolate between the background screen pixel at that point and the drawing color of the character. This gives a correctly antialiased character even if it is drawn on a multicolor background.

Finally, the method of the invention provides for proportional intercharacter spacing. This means the spacing between characters varies depending on what the two characters are. This has the additional effect of making the characters appear much more uniformly laid out.

b. Character Definition

Character fonts are initially defined using a high resolution graphics display unit. As shown in FIG. 1*a*, the graphics display unit 100 is connected by a communications link 101 to a computer 102, generally known as a "personal" or "micro" computer. Together, these two computer systems are used to define the character fonts and to store them as splines.

Figure 1B:
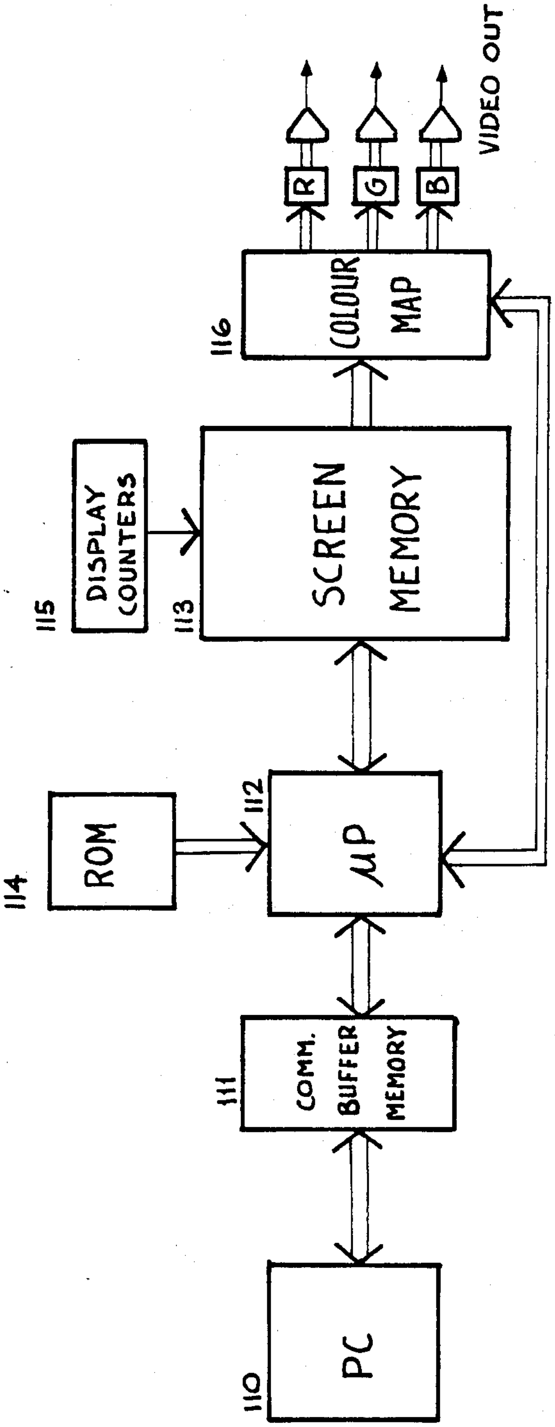
FIG. 1*b* is a block diagram of the components and hardware of one embodiment of the electronic character display system of the present invention.

FIG. 1*b* shows the components and hardware of a system for storing and displaying the characters developed on the system of FIG. 1*a*. The characters are stored in the memory portion of a computer 110 and displayed through use of a graphics display unit comprising elements 111–116.

First, each graphic character is constructed in bitmap form on a 96×96 grid displayed on the graphics display unit. This is accomplished by manually turning on and off pixels on the display in order to achieve the desired bitmap. During the course of construction of the character, the effective reduction on two lower resolution forms are simultaneously monitored.

In this embodiment, the lower resolutions are displayed on grids of 48×48 and 24×24, representing reductions by ½ and ¼, or (¼ and 1/16 in terms of area) respectively. Thus, the lower resolutions of the graphic character being constructed can be monitored during construction of the high resolution form of the character. Should any of the lower resolution forms be unsatisfactory, the high resolution form can be altered until all three sizes of the character are satisfactory.

Figure 2A:
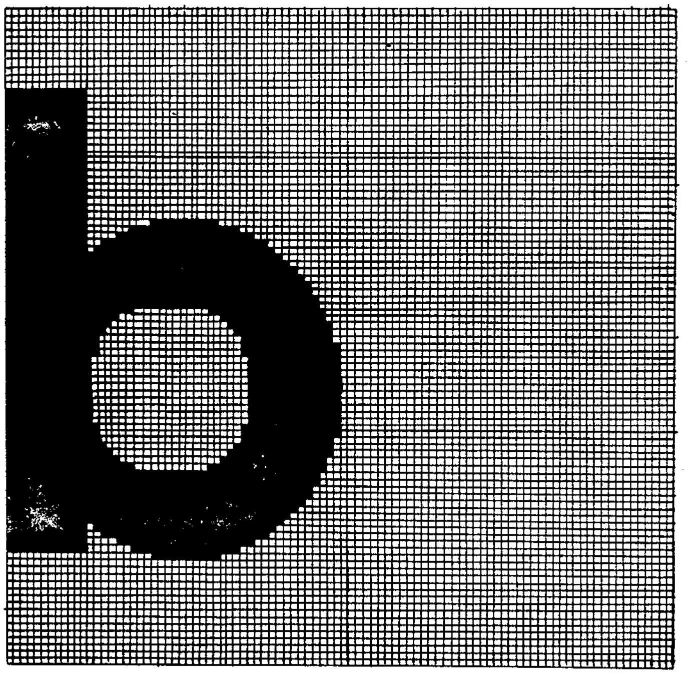
FIG. 2*a* is a diagram illustrating the graphic display of a character at a relatively high (96×96 pixels) resolution grid.
Figure 2B:
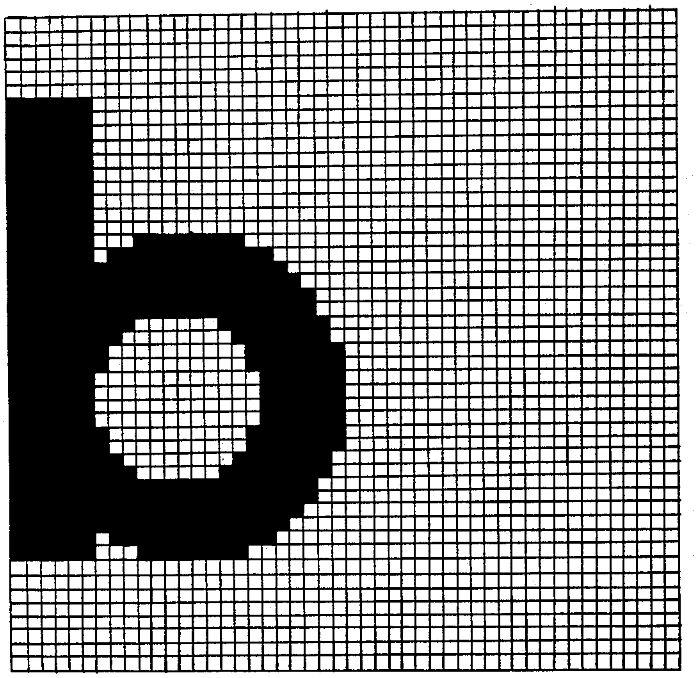
FIG. 2*b* is a diagram illustrating the graphic display of a character at a medium (48×48 pixels) resolution grid.
Figure 2C:
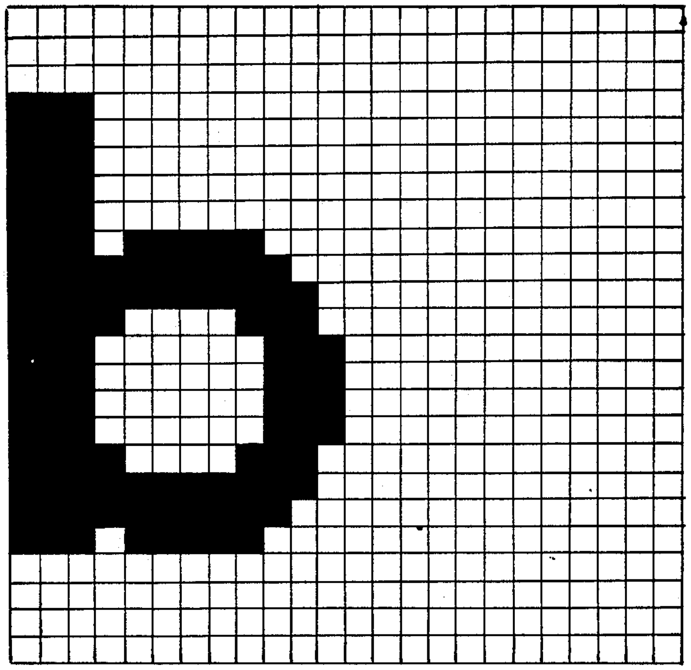
FIG. 2*c* is a diagram illustrating the graphic display of a character at a relatively low (24×24 pixels) resolution grid.

FIGS. 2*a*, 2*b*, and 2*c* illustrate three levels of resolution of the letter "b" as displayed by the graphics display unit. FIG. 2*a* illustrates the highest resolution of the letter "b" constructed on a 96×96 grid. FIG. 2*b* shows the character displayed at an intermediate resolution on a 48×48 grid and FIG. 2*c* is a low resolution representation of the letter "b" on a 24×24 grid. These displays are all single bit fonts and are not antialiased.

The highest resolution character is constructed on the visual display by switching on and off pixels. In going from a foursquare section of the grid of the high resolution character of FIG. 2*a* to a corresponding single square section of the intermediate resolution of FIG. 2*b*:

(A) Where none of the four squares of FIG. 2*a* are illuminated, then the corresponding square in FIG. 2*b* will not be illuminated, (B) Where one of the four squares of FIG. 2*a* is illuminated, then the corresponding square in FIG. 2*b* will not be illuminated, (C) Where two of the four squares of FIG. 2*a* are illuminated, then the corresponding square in FIG. 2*b* will not be illuminated, (D) Where three of the four squares of FIG. 2*a* are illuminated, then the corresponding square in FIG. 2*b* will be illuminated, and (E) Where all of the four squares of FIG. 2*a* are illuminated, then the corresponding square in FIG. 2*b* will be illuminated.

The algorithm used as described above is necessary because at small character sizes one pixel will have a size to significantly effect the character line width. The significant decision is that made under step (c) above which theoretically could be made in the opposite way. We have found contrary to what one might think it is not an arbitrary decision. The algorithm favours turning off pixels which ensures the retention of background features to prevent degregation of the bowl effect of for example an O or E or of the space between parts of the character as typified by the inner curve of an S. This is a non-obvious step.

Figure 2D:
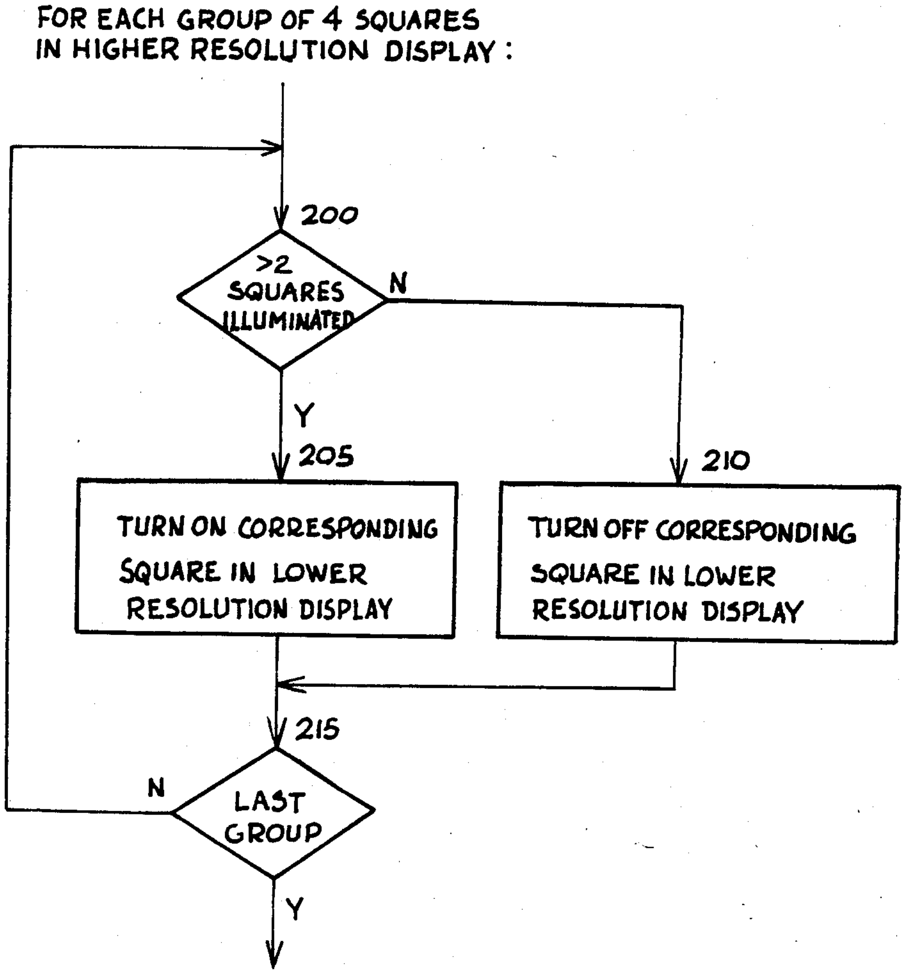
FIG. 2*d* is a flow chart illustration of a computer program for generating a lower resolution character display from a higher resolution display.

FIG. 2*d* is a flow chart illustrating the basic operation of a computer program executed by the graphics display unit 100 of FIG. 1*a* for generating a lower resolution character display from a higher resolution display. For each group of four squares in the higher resolution display, steps 200–215 are executed to produce the lower resolution display.

In step 200, it is first determined how many of the group of four squares in the higher resolution display are illuminated. If greater than two of the four, i.e., three or four, are illuminated, then step 205 is executed. If fewer than three squares, i.e., zero, one, or two, in the higher resolution display are illuminated, then step 210 is executed.

In step 205, the square in the lower resolution display corresponding to the group of four squares in the higher display is turned on. Otherwise, in step 210, the corresponding square is turned off. Steps 200–215 are repeated for each group of four squares in the higher resolution display until the program terminates after the last group via the Y branch of step 215.

This method affords the advantage of allowing a person constructing the high resolution form of the character to see exactly how it will appear in low resolution. Normally, the high and low resolution constructions would be the maximum and minimum for display, although higher resolution forms could be obtained and displayed.

It can be seen from FIGS. *2a*, *2b* and *2c* that the construction of the character at the highest resolution is so arranged that the boundaries of the character are in a position such that when displayed at the lower resolution that the boundaries coincide with the edge or boundary of a pixel. Similarly it will be seen that the current portions of the character is arranged to fix pixel transitions in a ratio of intergers, not greater than 3 to 1 or of a ratio of 1 to integers not greater than 3, i.e. 3:1, 2:1, 1:1, 1:2 and 1:3.

Similar considerations arise in choosing inclined straight lines. It can be readily appreciated that ratios such as 1.5:1 are inappropriate.

c. Spline Generation

Once a character has been constructed, curves are fitted around its periphery. Where appropriate, curves are also fitted around the inner periphery, for example in the case of a zero or the "b" of FIG. *2a*. In this embodiment, the type of curves used are Hermite splines.

A spline is a parametric cubic equation in which the X and Y values of each point along a curve are represented as third order polynomials of some parameter t. Four coefficients define the coordinate point locations and tangent vectors of each of the curves' end points and by varying t from 0 to 1, a curve is described. A Hermite spline curve is of the following form:

$$
\begin{aligned}
X(t) &= X0(2t^3 - 3t^2 + 1) + \\
&\quad X1(-2t^3 + 3t^2) + \\
&\quad XV0(t^3 - 2t^2 + t) + \\
&\quad XV1(t^3 - t^2)
\end{aligned}
$$

$$
\begin{aligned}
Y(t) &= Y0(2t^3 - 3t^2 + 1) + \\
&\quad Y1(-2t^3 + 3t^2) + \\
&\quad YV0(t^3 - 2t^2 + t) + \\
&\quad YV1(t^3 - t^2)
\end{aligned}
$$

where X0, Y0 and X1, Y1 are the two end points and XV0, YV0 and XV1, YV1 are the two tangent vectors at the end points. The end points and tangent vectors are graphically illustrated in FIG. 3.

It is not necessary to use Hermite spline functions to define straight lines since all that is required to define a line are its two end points. Therefore, straight lines may be treated as special cases without tangent vectors or with vectors of (0,0).

Figure 4:
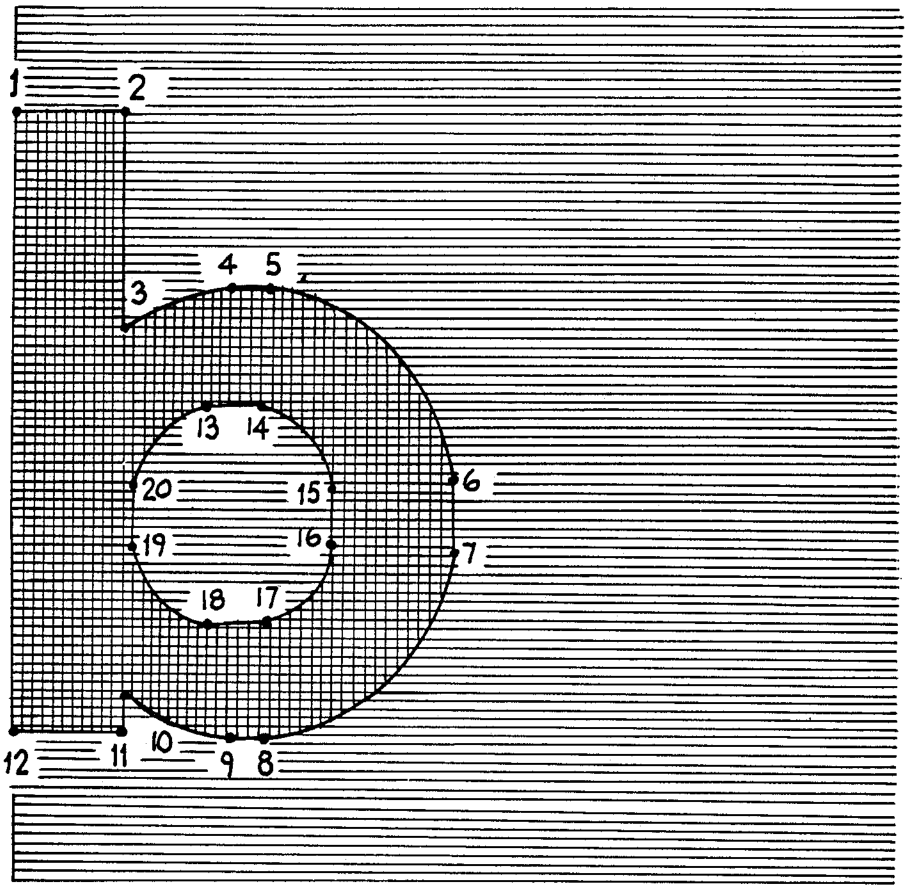
FIG. 4 is a diagram illustrating the graphic display of a character at a relatively high resolution with spline curves added.

Splines are illustrated constructed around the high resolution character "b" of FIG. 4. As can be seen in this particular example, the letter is constructed of twenty (20) curves, namely curves 1–2, 2–3, 3–4, etc. up to 20–13.

It should be noted that the characters are each constructed without any gray scaling. Thus gray scale values do not have to be stored. Gray scaling of vertical and horizontal lines is also avoided by constructing the spline curves so that all vertical and horizontal lines fall on the boundary lines of the grid. This is effected for all three sizes of each character and other sizes where the size multiple is a factor of the grid square forming the height, width, or other dimension of the character.

Figure 5:
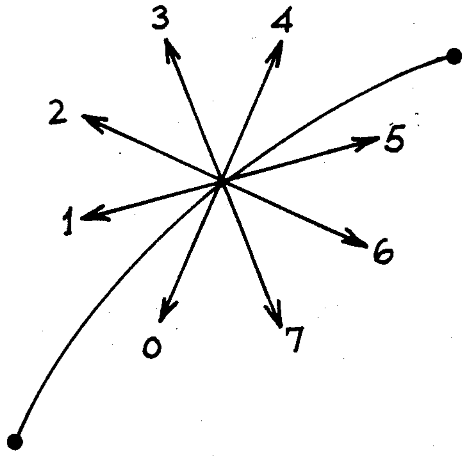
FIG. 5 is a diagram showing the inside directions used for spline definitions.

Since splines can represent only conceptual curves (i.e., a collection of points, haing no width) it is necessary to define an "inside" direction for each spline. The "inside" direction is the direction of the interior or filled portion of the character relative to the spline curve. Any of eight directions may be specified as shown in FIG. 5, roughly corresponding to eight evenly distributed compass points.

An integer value 0 to 7 representing the inside direction is stored with the spline coordinates and is used in regenerating the pixelmap representation of the character as described below in connection with FIGS. *9a* and *9b*. Thus, a single spline curve can be defined by a set of four X-Y coordinate values (X0, Y0, XV0, YV0, X1, Y1, XV1, YV1) plus an inside direction value.

The system of the present invention fits splines to the high resolution bitmap characters in a semi-automatic manner. An objective of this fitting process is that the spline representation when laid out on a high resolution grid should produce the same original character bitmap.

In the present system, the user enters via the computer input keyboard the spline end points and enters an initial guess at the end point vectors. As will be described in detail below, a program executed by the computer adjusts the end point vectors to minimize the difference (error) between the spline-generated bitmap and the original bitmap. In most cases, this results in a perfect match.

Each end point vector of a spline is represented by an X and a Y component, so for each spline there are four variables to adjust in order to minimize the error. The error function can be thought of as a function of these four variables which returns the error as the number of incorrect pixels in the regenerated bitmap. Incorrect pixels are those which do not match the master (original) bitmap.

A spline generated bitmap is in fact a spline generated pixelmap with one bit per pixel.

Figure 6:
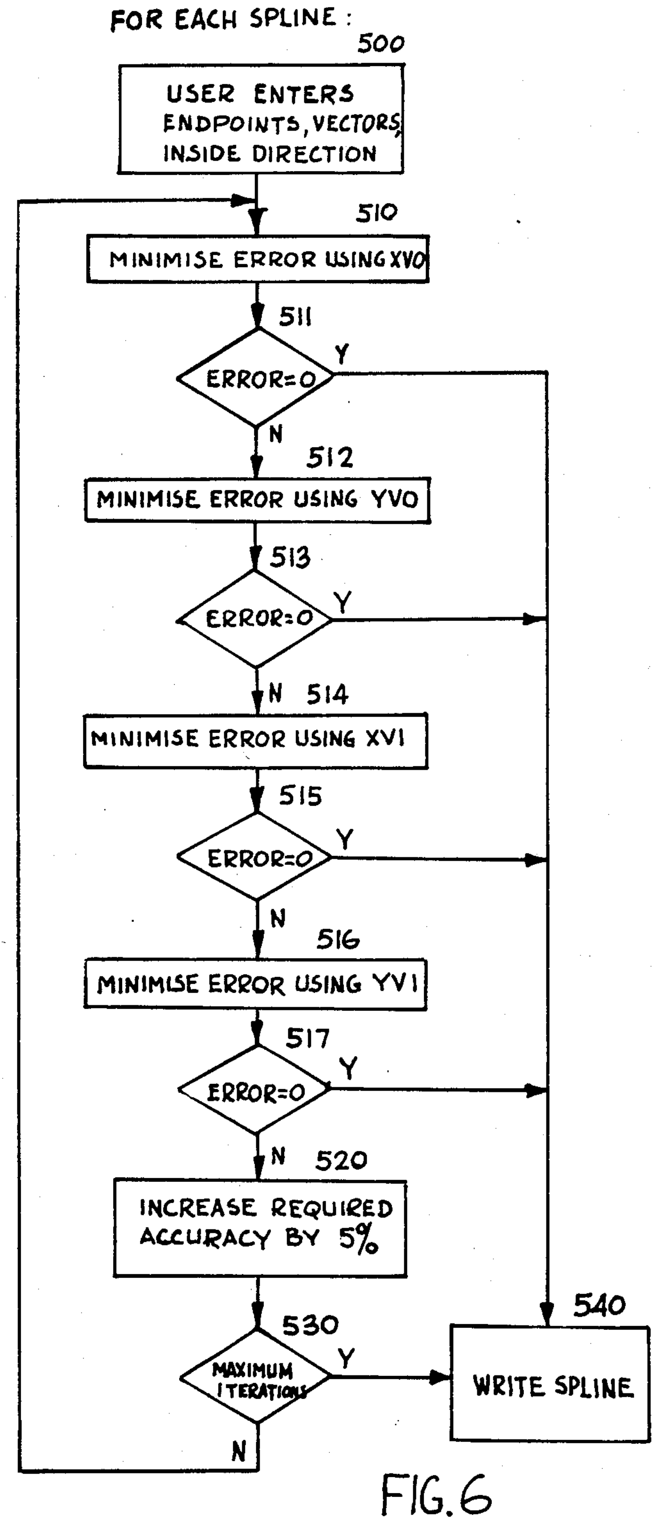
FIG. 6 is a flow chart illustration of a computer program for controlling a spline fitting operation.

To fit a spline to a bitmap edge, a computer program loop is executed up to a preset number of times and the error is calculated after each iteration. The program is executed for each of the splines on the character boundary. FIG. 6 is a flow chart illustrating the operation of the spline generation and fitting software program of the system of the invention. For each spline which the user has chosen, the steps 500–540 are executed to produce as an output a spline definition for each curve.

In the first step 500, the user manually enters X-Y coordinate values for the chosen end points of the curve and enters an initial guess at the end point vectors. This is done via the system input keyboard while the master bitmap image is displayed on the graphics display unit.

Figure 9A:
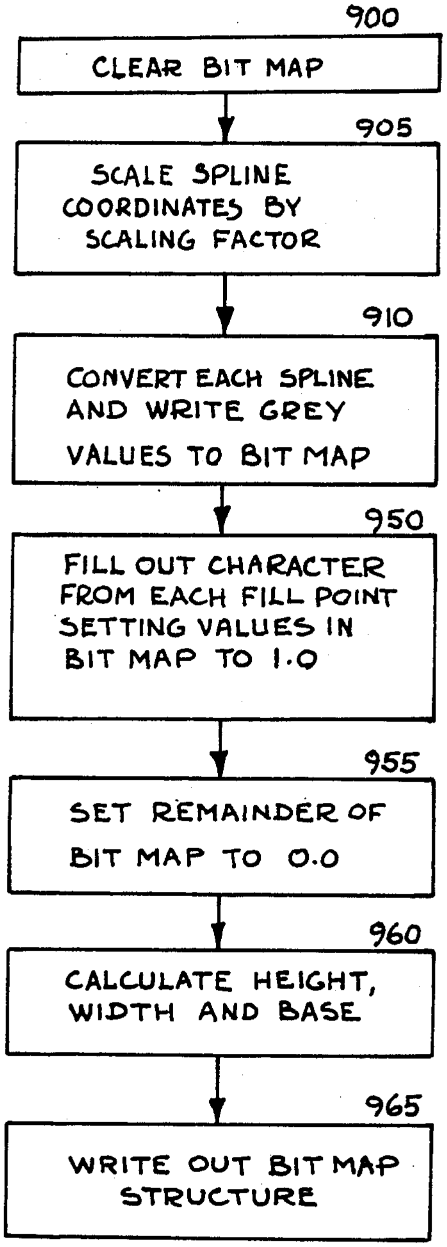
FIGS. 9*a* and 9*b* are flow chart illustrations of a computer program for controlling a spline conversion operation.
Figure 9B:
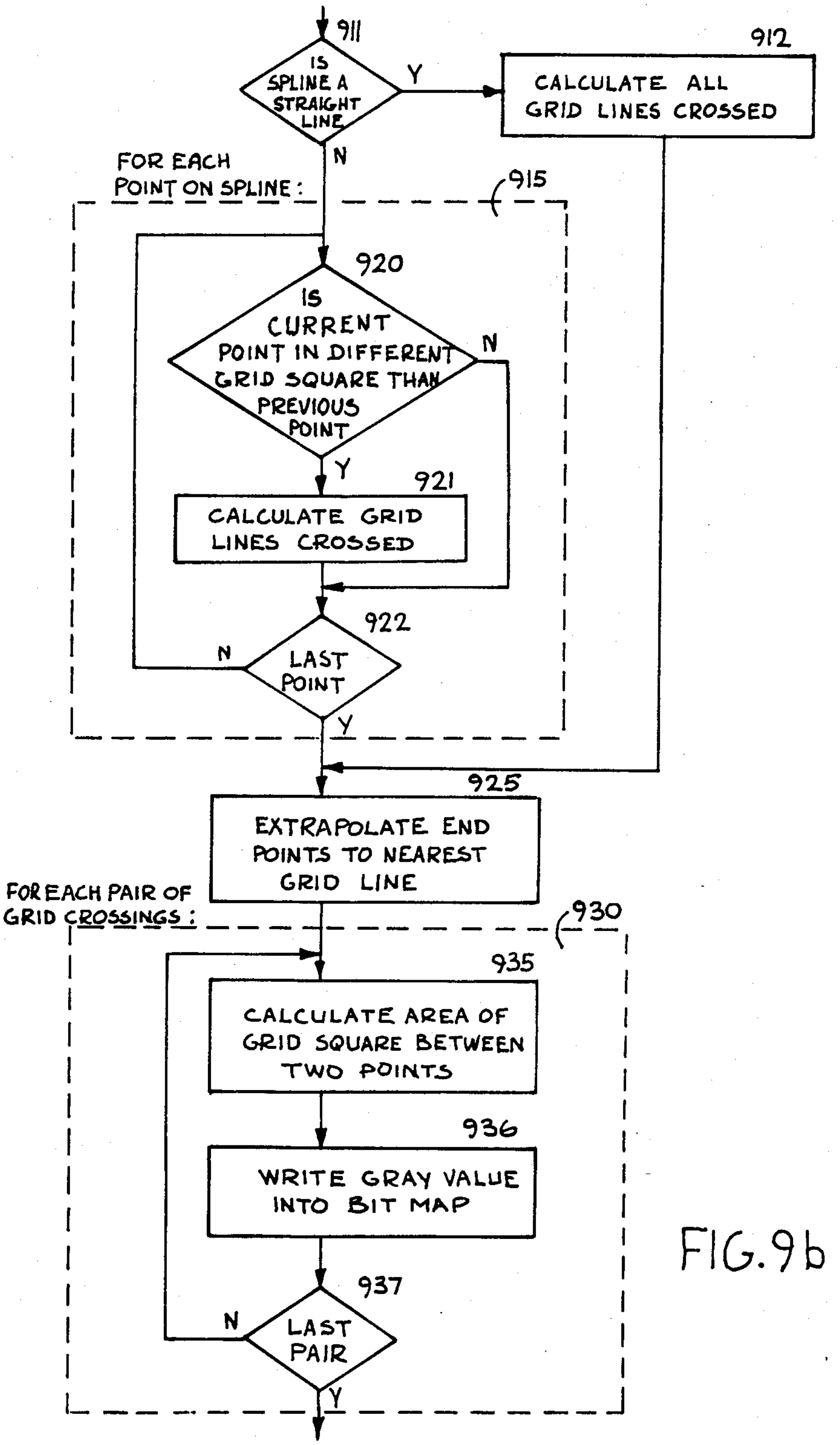

Step 510 finds a value of XV0 which produce a bitmap with a minimum number of mismatches with the original bitmap while holding the other three variables (YV0, XV1, YV1) constant. Subroutine 510 constructs a series of spline curves using different values of XV0. A bitmap representation of the character is generated for each spline curve using the subroutine hereinafter described in connection with FIGS. 9a and 9b. The constructed bitmap is compared with the master bitmap and an error value calculated and stored for each value of XV0. An optimum value for XV0 is determined by first increasing the current value of XV0 until the error value for the spline which is generated also increases. XV0 is then decreased until the error value is again greater than for the original value for XV0. The optimum XV0 is chosen as the mid-point between these two XV0 values which produced increased error values.

If the error value returned in step 510 is 0, i.e., the spline produces a bitmap identical to the original, then in step 511 the optimization loop for the spline is completed and the program exits step 511 via the Y branch. The spline coordinates are written out to a memory or disc file in step 540.

Assuming zero error is not produced, the above process is repeated in steps 512–517 to determine minimum error values for YV0, XV1, and YV1. If at any point the error is 0, then the spline fitting/optimization is terminated through the Y branches of steps 513, 515 or 517 and the spline coordinates are stored in step 540.

If zero error is not detected in step 517, step 520 is executed to increase the degree of accuracy used in the above steps by 5 percent. This is achieved by reducing the increment between the XV0, etc. value used in the optimization steps 510, 512, 514, and 516.

In step 530, if a predetermined maximum number of iterations is reached and a perfect match (zero error) has not been achieved, the program terminates by storing the last set of optimized spline coordinates. This step merely prevents an endless loop if for some reason a perfect match cannot be reached.

Figure 3:
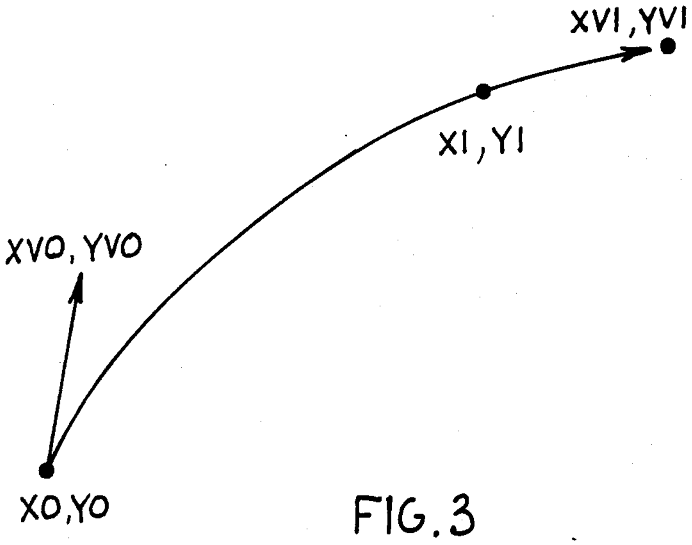
FIG. 3 is a graphic illustration of a Hermite spline curve showing the end points and tangent vectors.

FIG. 7 is an example of a spline list generated by the FIG. 5 program for the letter "b" illustrated in FIG. 3. There are twenty spline definitions beginning "SP" in the list corresponding to each of the twenty splines in FIG. 3. These splines do not have to be stored in any particular order. The first eight values in each line represent X0, Y0, XV0, YV0, X1, Y1, XV1, and YV1, respectively. The last value in each line is the inside direction as described above.

The last items in the list are fill point coordinate values noted "FP". This is a point within the character boundary which is manually specified when the splines are fitted to the character. The fill point is used to identify the interior or filled portion of the character when it is stored as a set of spline coordinates. More than one fill point may be necessary to store such characters as ":" or "%" which have disconnected parts.

d. Character Generation and Display

All characters are stored, as just described, as a set of spline coordinates. They may be stored on floppy discs, in computer memories, in ROM, or any other way of storing computer data.

In order to display a character, a pixelmap of the character of the desired size is constructed from the set of stored spline coefficients. The pixelmap includes gray scale values for each boundary square through which the curve passes. Before displaying the character, the edges are antialiased, i.e., smoothed, by mixing the drawing color of the character and the background color in each boundary square in proportions determined by the gray scale factor.

While this method includes the step of antialiasing by taking account of the character color and the background color, in a monochrome display, the gray scale factor can be used directly. It may also be that certain common sizes of common characters may be directly stored in pixelmap form. In such a case, the gray scale value for each character would already have been calculated and where the character is to be displayed in color, all that is required is to carry out the antialiasing step of interpolating the foreground and background colors prior to display.

FIG. 1b is a block diagram of the components and hardware of one embodiment of a system for storing and displaying characters. The characters are stored, whether in spline or pixelmap form, in a memory of disc file of a computer 110. The computer 110, generally known as a "personal" or "micro" computer is connected to a communications buffer memory 111 of a graphics display unit comprising elements 111–116. These elements may be realized as additional circuitry within the computer hardware, but for present purposes are treated as being separate.

The actual graphics display is accomplished by means of a microprocessor 112 and a screen memory 113. The screen memory has one location for each pixel on the screen. For a display of 640 horizontal by 480 vertical pixels, a screen memory having 307,200 storage locations is needed. The value stored at each location corresponds to the color of the pixel. If the location can hold 256 different values then the screen can display 256 different colors. Typically, where the screen memory has one byte (8 bits) per location, the byte will be broken up into three individual color components, red (3 bits), green (3 bits) and blue (2 bits). Each color can vary from full off (all zeros) to full on (all ones) with ranges in between determined by the number of bits available.

In addition, the microprocessor 112 has access to a read-only-memory (ROM) 114 in which fixed display command routines are stored. These display command routines implement standard graphics display functions (such as drawing lines) which are not involved in the display of characters.

Figure 8:
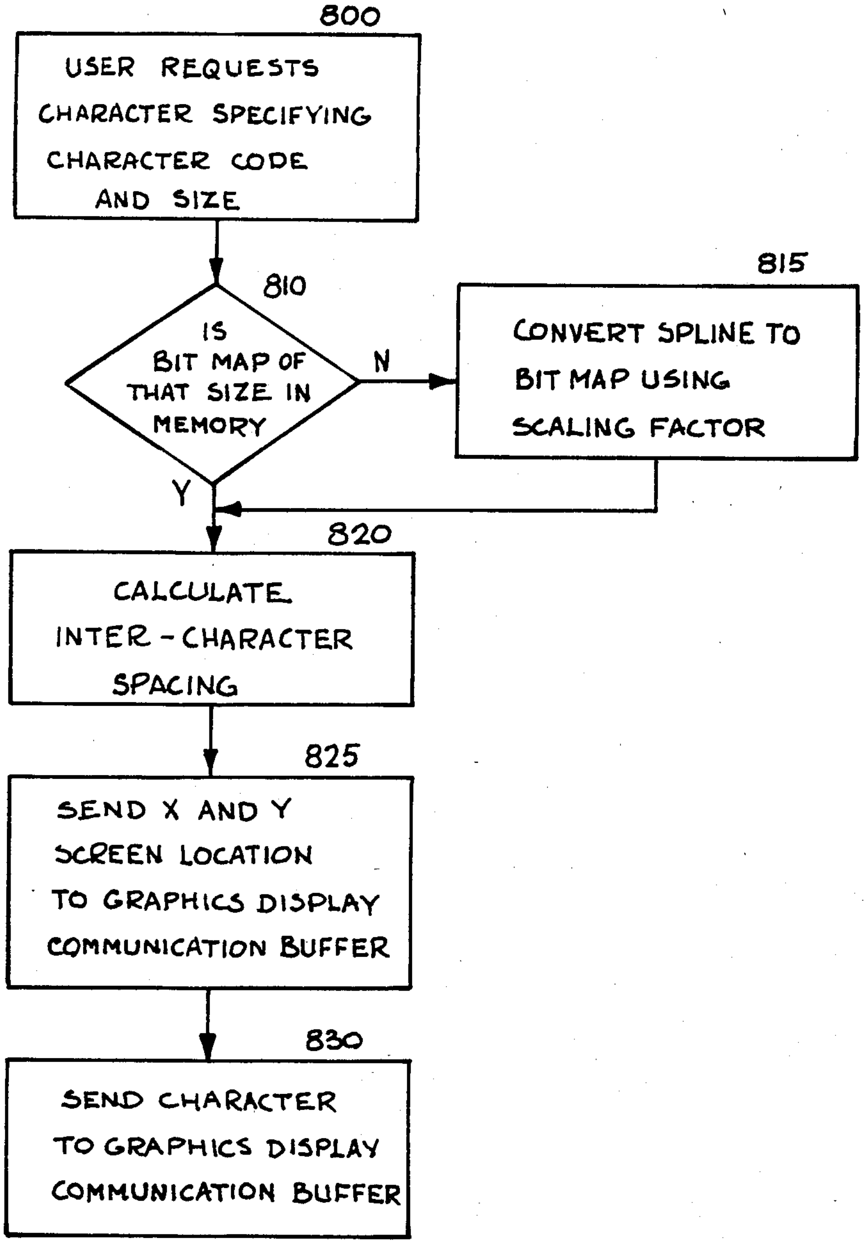
FIG. 8 is a flow chart illustration of a computer program for controlling the character display operation.

FIG. 8 is a flow chart illustrating the basic operation of a computer program executed by computer 110 for generating and displaying a character. In the first step 800, the user requests a character to be displayed on the video screen. Typically, this could be achieved through any applications program such as word processing, or a graphics display package which uses the invention. In requesting a character, the user (or the applications program) indicates the character code, for example an ASCII code, and the size of the character to be displayed.

Step 810 determines whether the character has already been converted to pixelmap form and is stored somewhere in computer memory. If it has not, then the character stored as a set of spline coefficients is converted to pixelmap form as in step 815. To vary the character size the spline coefficients are multiplied by the necessary factor to give the desired size and shape. Because the characters are stoned in spline form they can be scaled up or down on the X or Y axis by the same or different factors or even by a factor which could be a function of the position to get for example inclined characters.

There are certain preferred factors which will produce particularly good results by having a minimum of the undesirable aspects of gray scaling for example of the long vertical line an L. Thus the factor should be such that the width of the character is an exact multiple of pixels. The choices of preferred character size scaling factors will be predetermined and offered to the operator. The subroutine executed in step 815 is described subsequently in connection with FIGS. *9a* and *9b*.

In step 820, the spacing between the requested character and the previous one is determined based on the shape of the two characters. The X and Y screen locations of the lower left hand corner of the requested character are then calculated in step 825, taking into consideration the spacing determined in the previous step 820.

The X and Y screen locations are then sent in step 825 to the graphic display communications buffer memory 111. The buffer memory is operated as a queue, containing read and write pointers which are updated as new characters are sent by the computer. Finally, in step 830 the pixelmap of the requested character is sent to the communication buffer memory.

e. Ceneration of pixelmaps from Splines

In order to generate a pixelmap from a set of splines, as is done in subroutine 815 of the FIG. 8 program, the curve of each spline is sampled to generate a pixel outline of the character by overlaying the curves with a grid of the appropriate density. Each grid square within the character outline corresponds to the area illuminated by a pixel on a visual display.

The grid squares through which the curve passes are identified as boundary squares and the "inside area" of each of the squares is calculated. The value representing the inside area for each boundary square gives a gray scale factor on a scale of 0 to 1, the total area of each square being assumed to be 1. This represents the relative intensity at which the pixel will be displayed. The character is then filled in starting at the fill point and turning on all pixels in every direction from that point to the boundaries.

FIG. *9a* is a flow chart illustrating the steps executed by the subroutine 815 of FIG. 8 for converting a set of splines to a pixelmap representation of a character. In the first step 900, an area of memory storage in the computer 110 corresponding to the desired grid size (e.g., 96×96) is initialized with all values being set to EMPTY. In step 905, the set of spline coordinates are scaled up or down according to a scaling factor determined by the size of the character requested. Step 910 is then executed to convert each individual spline in the spline list to a set of gray scale values forming the pixel outline of the character. The subroutine executed in step 910 is described further with reference to FIG. *9b* below.

In step 950, the character is filled out from each fill point to the boundaries. The values in the pixelmap array are set to a gray value of 1.0 (or "full on"). The remainder of the pixelmap is then zeroed out by setting all of the empty values to 0.0 (or "full off").

Figure 11A:
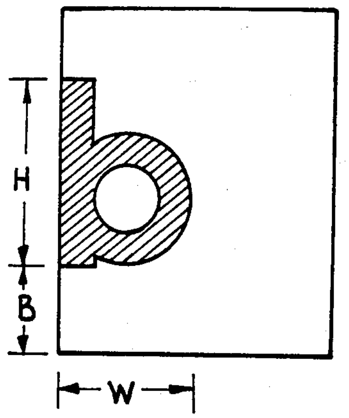
FIGS. 11*a* and 11*b* are diagrams showing the structure and organization of a character pixelmap as it is stored in the character display system.

In step 960, the height, width, and base of the character in pixelmap form are calculated. These are integer values representing the number of pixels or grid squares across each dimension. As shown in FIG. 11*a*, the width (W) and height (H) represent these two dimensions of the character in pixelmap form, and the base (B) is the number of grid squares or pixels up from the bottom of the grid.

Figure 11B:
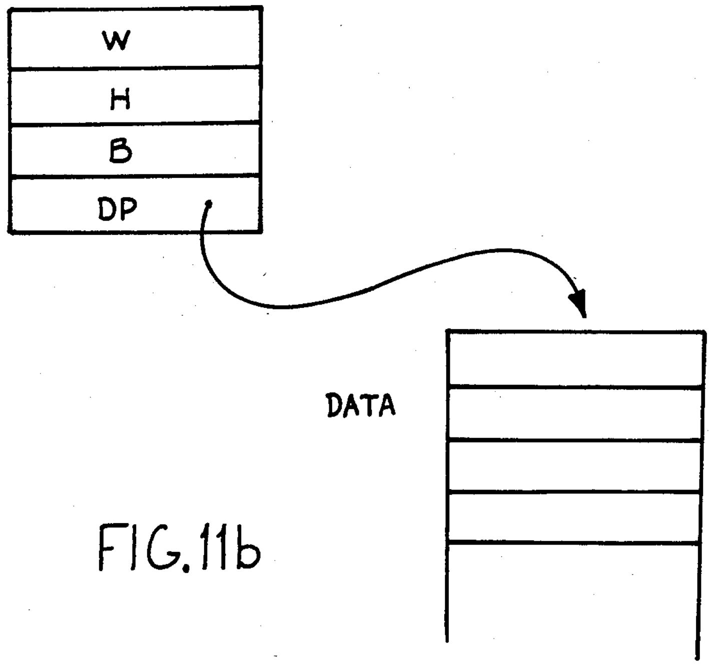

In step 965, the pixelmap is written to the memory or disc file in a specific format or "font structure". As shown in FIG. 11*b*, the font structure comprises four words, W, H, B, and DP. The first three, W, H, and B, contain the width, height, and base respectively, and the fourth, DP, contains a data pointer to an array of gray values corresponding to each pixel. The gray values are stored in a predetermined order, for example in rows from left to right starting in the lower left hand corner and moving up.

FIG. *9b* is a flow chart illustrating the steps of the subroutine 910 of FIG. *9a* for converting a single spline to gray values outlining the character. In step 911, it is first determined whether the spline is a straight line, and if so it is treated as a special case. The tangent vectors at the end points of a straight line are both stored as (0,0). For a straight line, the locations of the grid line crossings are calculated and stored in step 912. Since the line is defined by its two end points, the entry and exit points of each grid square crossed are calculated directly from the slope of the line.

If the spline is not a straight line, iterative loop 915 calculates grid crossings for each succession of points. First, the points on the spline are defined by varying t from 0 to 1 at a suitable number of discrete locations (e.g., 40). The absolute location in X-Y coordinate terms of each point is compared to the previous point to determine whether the spline has crossed a grid boundary. If so, the X-Y coordinate values of the crossing are calculated in step 921 by interpolating between the two points. The sequence is repeated in step 922 for each pair of points defined along the curve.

Figure 10A:
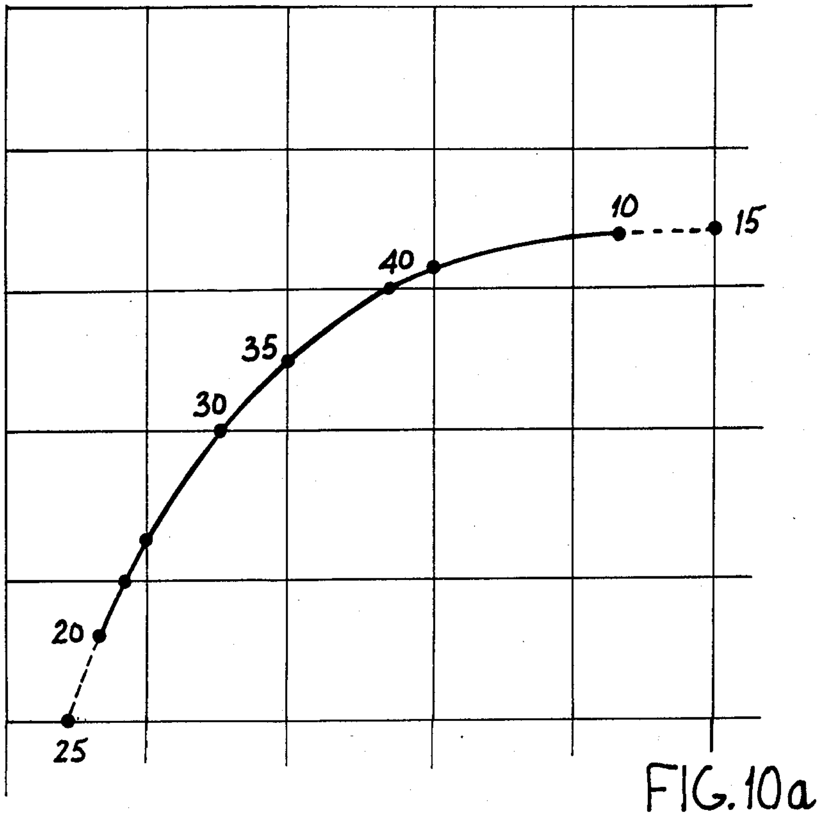
FIGS. 10*a* and 10*b* are diagrams illustrating a spline curve plotted against a grid for conversion to pixelmap form.

It may be that the end points of a spline do not fall on a grid boundary, in which case the end point must be extrapolated until it reaches the boundary. This is shown in FIG. 10*a* as the two end points of the curve 10 and 20 are extended to the grid boundaries to points 15 and 25 respectively.

Figure 10B:
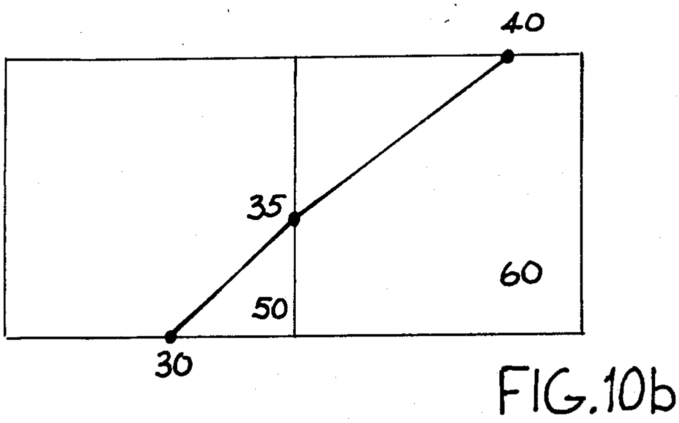

From this list of grid crossings, represented as X-Y coordinate values, iterative loop 930 calculates the gray scale value for each boundary square. For each pair of grid crossing points, step 935 calculates the inside area of the square using, in part, the inside definition of the spline. The curve as it passes through each square is approximated to be a straight line and the area is then calculated. As shown in FIG. 10*b*, area 50 represents the inside area of the line drawn between crossing points 30 and 35, and area 60 for the area between points 35 and 40.

In step 936, the area thus calculated is then written to the appropriate location in memory of computer 110 corresponding to the sampling grid. This sequence is repeated in step 937 for each pair of grid crossings including the end points or the extrapolated end points if necessary.

f. Proportional Intercharacter Spacing

Once characters are stored in pixelmap form, the spacing between characters can be determined by storing the width of each character and using this width when writing the pixel into the screen memory. If constant spacing is used between all characters, however, an effect of uneven character density is created. For example, an uppercase 'W' should be closer to a "A" than to an 'E'.

The system of the present invention provides such proportional intercharacter spacing for character display in a way that is efficient in both memory and CPU time. This function is performed by a computer program executed by computer 110 as part of the basic operation of displaying a character shown in FIG. 8.

Since the spacing is dependent on both characters, one approach is to store a table of spacings indexed by the preceding character and the succeeding character. This is impractical, however, due to the amount of storage required. For example, with a 256 character set, this would require a table with 65,536 entries.

Instead, for each member of the character set, an entry is assigned in a "character shape" table stored in the computer memory. Each entry in this table has a "left" and "right" field which describes the shape of the character on that side. The actual entries in the table are numbers which represent such shapes as "VERTICAL BAR" or "CONCAVE CURVE".

A spacing table is also provided in computer memory, indexed by the preceding shape and the succeeding shape, which holds the proper proportional spacing. FIG. 12 is one example of such a spacing table. Table entries represent only the proportional spacing between characters and may be scaled up or down depending on the actual size of the characters. Table entries may also be negative, such as in the case of "WA", allowing the pixelmaps to overlap.

To find the spacing between two characters, a computer program for calculating intercharacter spacing reads an entry from the "character shape" table in computer memory to find the right shape of the preceding character and the left shape of the succeeding character. The program then uses the character shape values as indices into the spacing table to read the correct intercharacter spacing from memory. For example, for a preceding character of an upper case "p" followed be a lower case "a", the spacing table of FIG. 12 would yield a proportional spacing value of "1".

As an example of the efficiency of this method, for a character set with 256 entries and allowing 16 different shape types for the left and right sides of the character, the "character shape" table and the spacing table will each require only 256 entries. This is a total of only 512 entries as opposed to 65,536 using the other method.

g. Interpolation and Screen Display

Prior to displaying a character, the curves are antialiased by mixing the drawing color of the character and the background color of each pixel in proportions determined by the gray scale factor. The value of the color for each pixel in the character display is calculated using the following formula which is applied to the red, green, and blue values of the pixel:

$$a \times c + (1-a) \times b$$

where:

"a" is the gray scale value on a scale from 0 to 1 already calculated,

"b" is the intensity of the background color, and

"c" is the intensity of the drawing color.

This is repeated for each of the color primaries, i.e., red, green, and blue. For easier implementation, the formula may be expressed in alternate form as:

$$a \times (c-b) + b.$$

Figure 13A:
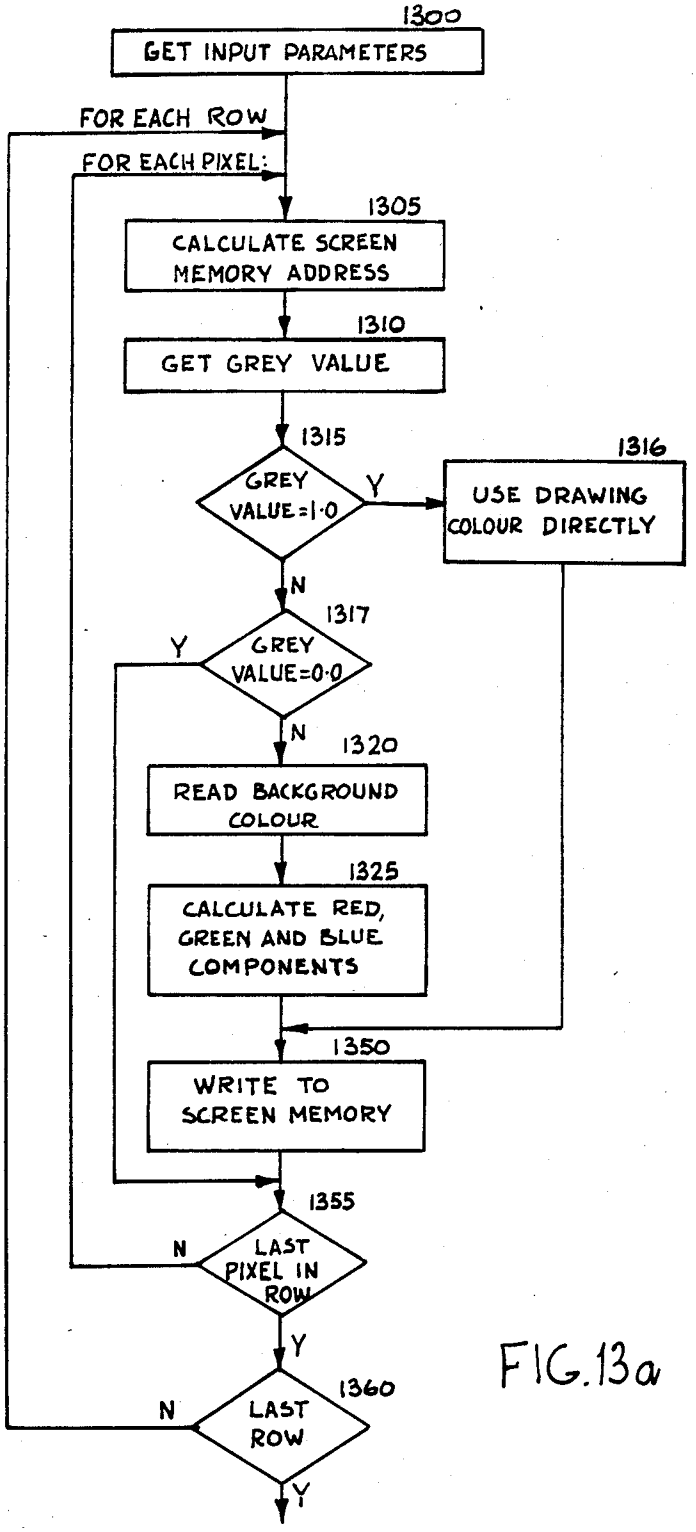
FIGS. 13*a* and 13*b* are flow chart illustrations of a computer program for controlling background interpolation and screen memory write operations.

FIG. 13*a* is a flow chart illustrating the functions of the computer program which controls the background interpolation and screen memory write operations. These functions are performed by the microprocessor 112 of the graphics display unit of FIG. 1*b*, with the FIG. 13*a* control program being stored in the communications buffer memory 111. This routine is initialized by the computer 110 after it has written a character pixelmap and its screen location into the input queue of the buffer.

In the first step 1300, the input parameters, including the X and Y coordinates of the screen location and the height and width of the character, are read from the input queue. For each pixel to be displayed in the pixelmap, steps 1305–1360 are executed to write the correctly antialiased pixelmap into the screen memory. The background interpolation and screen memory write operations are performed one row at a time operating on each pixel in each row in a predetermine order according to the way the pixelmap is stored.

It will be readily appreciated that an optional intermediate step could be that the character could be drawn anti-aliased onto a temporary buffer in main memory and subsequently copied into screen memory.

In step 1305, the screen memory address for the pixel is calculated according to the X-Y screen location and the pixel's position in the pixelmap. The screen memory address corresponds to a physical location on the video screen for display of a single pixel.

In step 1310, the gray value for the pixel is read from the input queue in the communications buffer memory. If it is equal to 1.0, i.e., full on, then no background interpolation is necessary. This condition is tested for in step 1315 and if positive, then in step 1316, the drawing color is selected as the value to be written to the screen memory.

Similarly, if the gray scale value is 0.0, i.e., full off, then nothing is written to the screen memory. This condition is tested for in step 1317.

If the gray value is between 0.0 and 1.0, then in step 1320, the background color is read from the screen memory. The background color is considered to be whatever is currently being displayed on the screen as stored in the screen memory. This allows the character to be displayed against a variety of backgrounds including overlapping other characters or graphics.

In step 1325, the red, green, and blue components of the pixel are calculated according to the method of interpolation. This step is described further with reference to FIG. 13*b* below. Finally, in step 1350, the value thus calculated is written to the screen memory at the address calculated in step 1305.

Figure 13B:
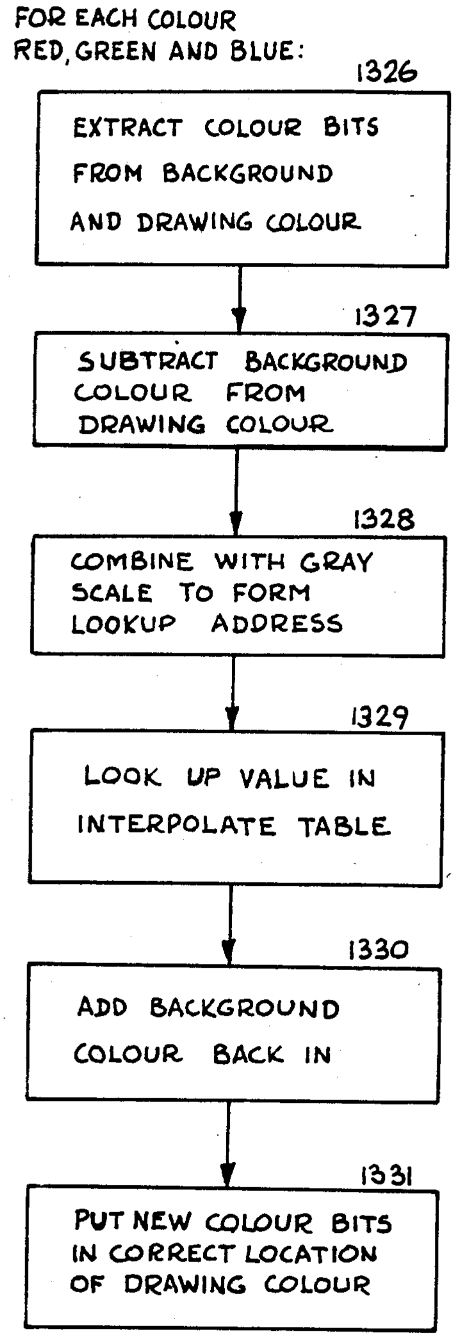

FIG. 13*b* is a flow chart further illustrating the method of interpolating the drawing color of the character and the background. Steps 1326–1331 are performed for each color component, i.e., red, green, and blue.

In step 1326, the color bits of the particular component are extracted from the back round and drawing colors. Typically, there are 3 bits for red, 3 bits for green, and 2 bits for blue, stored in fixed locations of the drawing and background colors.

In step 1327, the background color bits are substracted from the drawing color bits in order to calculate $(c-b)$ as in the alternate expression of the formula above. Steps 1338 and 1339 effectively multiply the gray scale value (a) times the difference between the background color and the drawing color $(c-b)$ by means of a lookup table. In step 1328, the value calculated in step 1327 is combined with the bit representation of the gray scale value to produce an index to a lookup table. In step 1329, the lookup is performed using a predetermined interpolation table containing values corresponding to $(a \times (c-b))$.

In step 1330, the drawing color is added back in to produce a value equivalent to $(a \times (c-b)+b)$. Finally, in step 1331, the result is stored in the proper bit locations of the drawing color to be written to screen memory.

Once the pixelmap of a character is written into the proper locations in screen memory, it is read out and displayed on a video screen by the hardware elements 115 and 116 of FIG. 1*b* as part of the entire screen display. The display counters 115 supply the address of each byte in screen memory which is read out in turn and stored in the output color map register 116. Each byte thus read from screen memory is broken down into its three color component, i.e., red, green, and blue, and then converted to video output for display on the screen.

While in the description, the interpolation between background and drawing colours has been carried out by operating on the primary colours, red, green and blue separately, it is envisaged that in certain cases the interpolation could be carried out by other means, for example, a more general description of the background and drawing colours could be used, such as, hue, lightness and saturation.

Additionally, while in the description a linear approach has been used in the interpolation method for mixing background and drawing colours, it is envisaged that other suitable approaches could be used, for example, other linear approaches could be used besides the approach specifically described, and furthermore, in certain cases it is envisaged that non-linear approaches may be used.

The choice of a linear rather than a non-linear approach will be influenced by the display technology. For example, bright pixels are larger than dark pixels on a VDU screen, hence the non linear approach may be necessary.

It will of course be appreciated that while the method and apparatus of the invention has been described essentially for creating, storing and displaying characters such as letters and numbers, any other characters, graphics or the like could be created, stored and displayed, for example, graphic primitives, punctuation marks, symbols, such as mathematical, music, characters of other languages, for example, Chinese script characters, Japanese script characters or the like.

While in the description we have described the fitting of splines to the characters using an iterative method, it will of course be appreciated that any other suitable or desired method could be used, for example, in certain cases it is envisaged that a non-iterative method may be used.

While in the description we have described the characters as being constructed in all cases from a continuous series of splines, it is envisaged that this will not always be necessary in that in certain cases it is envisaged that there may be breaks between certain spline curves. In such cases, it is envisaged that any break will be joined by interpolation between the two adjacent curve end points.

It is also envisaged that while a polygon fill algorithm has been used for filling the characters, any other suitable or desired algorithm could be used, for example, a polygon algorithm could be used in which a point within the polygon was not required as a parameter. This, it is envisaged, would be achieved by scanning the characters and counting the boundaries encountered on each scan.

It is envisaged that the characters can also be created so that at least some of the characters share certain common shaped portions. In which case, it is envisaged that the common shaped portions will be stored separately, and each character will comprise a reference to the appropriate common shape or shapes. It is further envisaged that in the case of certain of the letters, for example, b, d, p and q, an entire shape could be stored in spline form, and the particular store for the character would comprise a reference to the shape and orientation. In other cases, it is envisaged that common portions of the characters may be stored separately, for example, the arcs of an "O", the straight leg of a "D" which would be common to, for example, a "B", a "P", a "q", an "L" and "I" or the like.

It is further envisaged that in certain cases the characters may be stored exclusively in pixelmap form, or indeed they could be stored exclusively in spline form, although needless to say, there are advantages as are apparent from the above description to having the characters stored in a combination of pixelmap and spline form.

The splines it will be appreciated may be straight lines or curves, indeed the curved portions of characters may be represented as a plurality of straight line segments.

It will of course be appreciated that while the invention has been described as comprising a method for intercharacter spacing, intercharacter spacing could be dispensed with, without departing from the scope of the invention. Further, it is envisaged in certain cases that the step of gray scaling could similarly be dispensed with without departing from the scope of the invention.

One of the many advantages of the present invention is that by virtue of the fact that the characters are created as single bit designs without gray scale, breakdown of the characters is avoided, in other words, the characters retain their shape and legibility over a considerably greater range of character sizes than characters known heretofore.

Another of the many advantages of the invention is that it permits characters to be displayed with a translucent appearance, in other words, it permits one to show through the character the background on which the character is drawn. This is achieved by virtue of the fact that the interpolation algorithm is applied to each pixel within the character, thus, the mix of drawing colour to background colour can be varied for each pixel within the character.

One advantage of having the characters stored in spline form is that it permits a character to be displayed in many variations, for example, it is envisaged that by operating on each spline co-ordinate of a character, the character could be converted from its general upright form to, for example, an inclined form, which it is envisaged would give the effect of italics. Further, by varying the co-ordinates of a character, a three-dimensional or perspective effect could be achieved.

The invention is not limited to the embodiment hereinbefore described, and may be varied in construction and detail.

We claim:

1. A computer system for displaying characters on a video screen, comprising:

storage means for storing a character as coefficients for spline curves which are a function of the character edges forming a boundary of the character;

a look-up table including an index of stored pixelmap colors for each combination of character color, background color, and gray scale value;

conversion means for converting said coefficients to form a pixelmap of the character, said pixelmap including gray scale values corresponding to said coefficients for spline curves from full on to full off for boundary pixels at the character edges and for selectively scaling the coefficients for displaying the character at different sizes;

display means for displaying the pixelmap of the character in a selected color against a background having a different selected color; and means including the table of stored pixelmap colors for mixing the character color and the background color for each boundary pixel in accordance with the gray scale value of the boundary pixel, the mixing means including, means for extracting color bits representing component intensity from each of the red, blue and green components of each of the background and character colors, means for subtracting the background color component bits from the character color component bits to provide a difference color component value, means for combining the difference color component value with the gray scale of boundary pixels to provide the index for the look-up table, means for referencing a corresponding pixelmap color component in the look-up table using the index, and means for adding the corresponding background color component bits to the referenced pixelmap color component.

2. The computer system set forth in claim 1 further comprising:

means for storing for each character a left and a right field shape, said field shapes being fewer in number than the total number of characters to be displayed;

means for storing a proportional spacing value for each left and right field shape; and means for determining the spacing between adjacent characters in accordance with said proportional spacing values.

3. A method of operating a computer system for displaying a character on a video screen, comprising the steps of:

storing a character as coefficients for spline curves which are a function of the character edges forming a boundary of the character;

providing, in a look-up table having an index, pixelmap colors for each combination of character color, background color, and gray scale values;

using said stored pixelmap colors for each boundary pixel;

converting said coefficients to form a pixelmap of the character, said pixelmap including gray scale values from full on to full off for boundary pixels at the character edges and for selectively scaling said coefficients for displaying the character at different sizes;

displaying the pixelmap of the character in a selected color against a background having a different selected color; and mixing the character color and the background color in the look-up table for each boundary pixel in accordance with the gray scale value of the boundary pixel, the step of mixing including, extracting color bits representing component intensity from each of the red, blue and green components of each of the background and character colors, subtracting the background color component bits from the character color component bits to provide a difference color component value, combining the difference color component value with the gray scale value of boundary pixels to provide an index for the look-up table, referencing a corresponding pixelmap color components in the look-up table using the index, and adding the corresponding background color component bits to the referenced pixelmap color components.

4. The method set forth in claim 3 further comprising the steps of:

storing for each character a left and right field shape, said field shapes being fewer in number than the total number of characters to be displayed;

storing a proportional spacing value for each left and right field shape; and determining the spacing between adjacent characters in accordance with said proportional spacing values.

5. A computer system for displaying characters on a video screen, comprising:

storage means for storing pixelmaps corresponding to characters, said pixelmaps including gray scale values from full on to full off for boundary pixels at the character edges;

a look-up table of stored pixelmap colors for each combination of character color, background color, and gray scale value;

display means for displaying the pixelmap of a respective character in a selected one of the stored character colors against a background having a different selected one of the stored background colors; and means for mixing the selected character color and the selected background color for each boundary pixel in accordance with the gray scale value of the boundary pixel, the mixing means including, means for extracting color bits representing component intensity from each of the red, blue and green components of each of the background and character colors, means for subtracting the background color component bits from the character color component bits to provide a difference color component value, means for combining the difference color component value with the gray scale value of boundary pixels to provide an index for the look-up table, means for referencing a corresponding pixelmap color component in the look-up table using the index, and means for adding the corresponding background color component bits to the referenced pixelmap color component.

6. The computer system set forth in claim 5 further comprising:

means for, storing for each character a left and a right field shape said field shapes being fewer in number than the total number of characters to be displayed;

means for storing a proportional spacing value for each left and right field shape; and means for determining the spacing between adjacent characters in accordance with said proportional spacing values.

7. A method of operating a computer system for displaying characters on a video screen, comprising the steps of:

storing in a look-up table pixelmap colors corresponding to each combination of character colors, background colors, and gray scale values from full on to full off for boundary pixels at the character edges;

displaying the pixelmap of a respective character in a selected color against a background having a different color; and mixing the character color and the background color for each boundary pixel in accordance with the gray scale value of the boundary pixel; the step of mixing including, extracting color bits representing component intensity from each of the red, blue and green components of each of the background and character colors, subtracting the background color component bits from the character color component bits to provide a difference color component value, combining the difference color component value with the gray scale value of boundary pixels to provide an index for the look-up table, referencing a corresponding pixelmap color component in the look-up table using the index, and adding the corresponding background color component bits to the referenced pixelmap color components.

8. The method set forth in claim 7 further comprising the steps of:

storing for each character a left and a right field shape; said field shapes being fewer in number than the total number of characters to be displayed;

storing a proportional spacing value for each left and right field shape; and determining the spacing between adjacent characters in accordance with said proportional spacing values.

9. A computer system for constructing and displaying characters on a video screen at a plurality of different degrees of resolution comprising:

means for setting up a higher resolution grid as an array of a plurality of pixels, for display of characters at a higher resolution;

means for setting up one or more lower resolution grids, each as an array of a lesser number of pixels, for display of characters at lower resolutions;

means for constructing a character at the higher resolution by switching pixels on and off to fit the higher resolution grid;

display means for displaying the said character at the or each lower resolution;

means for altering the shape of the said character at the higher resolution by changing pixels of the higher resolution grid in response to user monitoring of the shape of the said character as displayed at the or each lower degree of resolution;

means for generating spline curve coefficients for determining boundaries of said altered character at the higher resolution;

storage means for storing said spline curve coefficients to provide a set of stored spline curved coefficients;

means for selectively scaling said stored spline curve coefficients to obtain scaled coefficients for generating pixelmaps in accordance with said scaled coefficients;

means for generating a pixelmap from said scaled coefficients, said pixelmap having gray scale values for each boundary pixel at the character edges corresponding to the percentage of the boundary pixel within the boundary as determined by said spline curve coefficients; and means for displaying a pixelmap for the character in accordance with the scaled coefficients.

10. A computer system according to claim 9 wherein said stored spline curve coefficients which correspond to vertical and horizontal boundaries of the character coincide with pixel boundaries.

11. A computer system according to claim 9 further comprising:

means for storing for each character a left and right field shape, said field shapes being fewer in number than the total number of characters to be displayed;

means for storing a proportional spacing value for each left and right field shape; and means for determining the space between characters in accordance with said proportional spacing value.

12. The system of claim 9 wherein the means for generating a pixelmap comprises a look-up table of stored pixelmap colors for each combination of character color, background color, and gray scale value.

13. A method of operating a computer system for constructing and displaying characters at a plurality of different degrees of resolution comprising the steps of:

setting up a higher resolution grid as an array of a plurality of pixels for display of characters at a higher resolution;

setting up one or more lower resolution grids, each as an array of a lesser number of pixels, for display of characters at lower resolutions;

constructing a character at the higher resolution by switching pixels on and off to fit the higher resolution grid;

displaying the said character at the or each lower resolution;

monitoring the shape of the said character as displayed at the or each lower resolution;

altering the shape of the character at the higher resolution by changing pixels of the higher resolution grid in response to the monitored shape of the said displayed character at the or each lower resolution;

repeatedly displaying, and monitoring the shape of, said character at the or each lower resolution and subsequently further altering the altered character until the character shape is visually acceptable when displayed at the higher and at each lower resolution; and generating spline curve coefficients for determining boundaries of said altered character at the higher resolution;

storing said spline curve coefficients of the character at the higher resolution to provide a set of stored spline curve coefficients;

scaling selectively said stored spline curve coefficients to obtain scaled coefficients for generating pixelmaps in accordance with said scaled coefficients;

generating a pixelmap from the scaled coefficients, said pixelmap having gray scale values for each boundary pixel at the character edges corresponding to the percentage of the boundary pixel within the boundary as determined by said spline curve coefficients; and displaying a pixelmap for the character in accordance with the scaled coefficients.

14. A method according to claim 13 wherein said stored spline curve coefficients which correspond to the vertical and horizontal boundaries of the character coincide with the pixel boundaries.

15. A method according to claim 13 further comprising the steps of:

storing for each character a left and right field shape, said field shapes being fewer in number than the total number of characters to be displayed;

storing a proportional spacing value for each left and right field shape; and determining the space between characters in accordance with said proportional spacing value.

16. The method of claim 13 wherein the step of generating a pixelmap comprises the substeps of:

storing in a look-up table pixelmap colors for each combination of character color, background color, and gray scale value; and referencing said look-up table for each boundary pixel.

* * * * *